(No Model.)
E. WAGES & S. H. ARMSTRONG.
GRIP COAL DRILLING MACHINE.
No. 433,556. Patented Aug. 5, 1890.
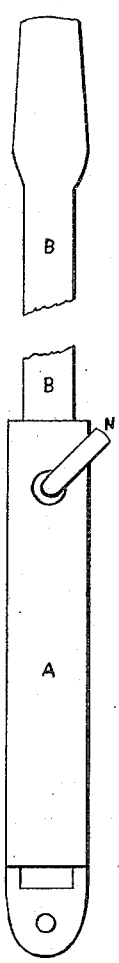
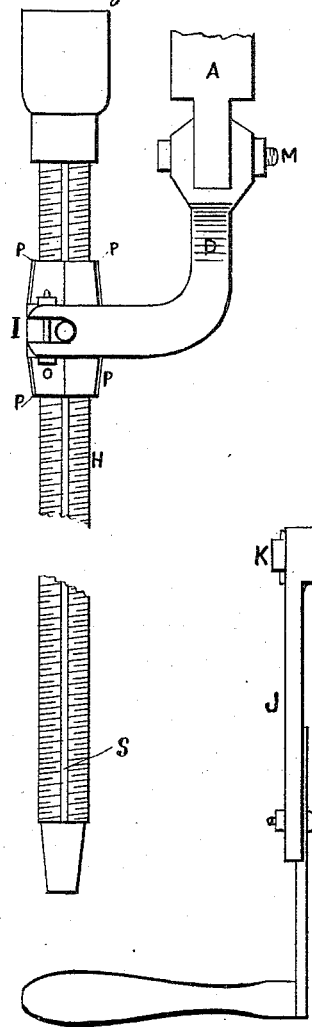
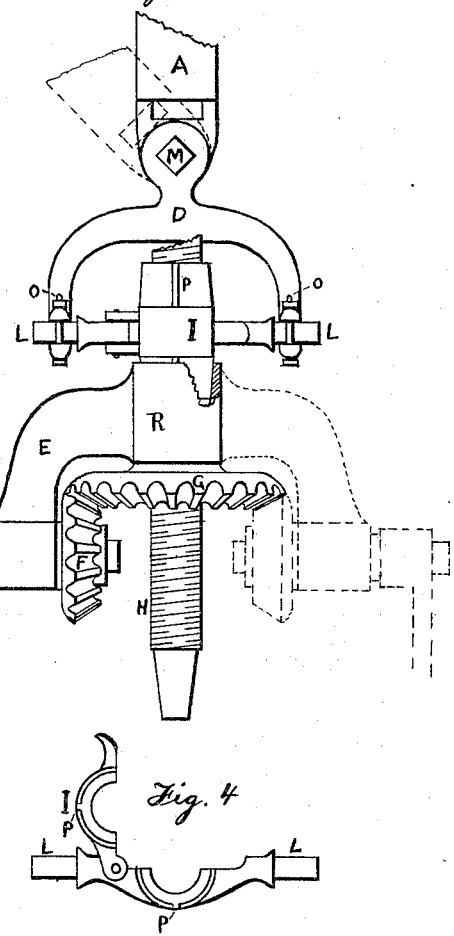

UNITED STATES PATENT OFFICE.

EDGAR WAGES AND SAMUEL H. ARMSTRONG, OF CANTON, ILLINOIS.

GRIP COAL-DRILLING MACHINE.

SPECIFICATION forming part of Letters Patent No. 433,556, dated August 5, 1890.

Application filed May 8, 1890. Serial No. 351,103. (No model.)

*To all whom it may concern:*

Be it known that we, EDGAR WAGES and SAMUEL H. ARMSTRONG, citizens of the United States, residing at Canton, in the county of Fulton and State of Illinois, have invented a new and useful Improvement in Coal-Drilling Machines, of which the following is a specification.

The object of the invention is to provide means for drilling or boring coal; and it consists in the devices and combinations hereinafter described and pointed out.

In the accompanying drawings, Figure 1 is an elevation partly broken away, a change of the position of the driving mechanism being indicated in dotted lines. Fig. 2 is a side elevation, the auger-turning mechanism being removed. Fig. 3 is an elevation of supporting device partly broken away. Fig. 4 is a view of a sleeve or boxing having one part hinged and represented as thrown open.

B denotes a supporting-bar adapted to be driven into the earth, coal, or rock, according to the situation. It enters a tube A, which is adjustable thereon, N being a set-screw for securing these parts in fixed relation to each other when properly adjusted. The lower end of the extension-tube A is provided with a perforated tenon, or it is otherwise adapted to be pivotally connected to a frame D, as by a bolt M. The frame D has two arms extending downwardly and bent laterally, as represented, which are slotted at their ends to receive the journals L of the sleeve I, and O O are bolts which secure said journals in the slots.

It will be understood that the parts A and D move freely in any plane at right angles to the bolt M, and that the part I moves freely in any plane at right angles to the longest axis of the sleeve I, and that these devices constitute a universal joint.

H indicates a screw-bar, to which the auger (not shown) is to be attached. This screw receives a screw-thread formed in the sleeve I, and has a longitudinal slot S to engage a rib or spline on the interior of a gear G. The bevel-gears G and F are supported by the bracket E. This bracket is provided with a socket R, which receives the sleeve I and holds its two parts in engagement with the screw H. The rib P enters a corresponding slot in the interior of the socket, so that these parts are prevented from rotating independently.

The gear F is supported upon its shaft K, which has a bearing in the bracket E, and G has a bearing in the socket R of the bracket and an internal rib or key engaging the slot S in the screw, whereby the rotation of the gear turns the screw and the auger attached thereto.

J is a crank for rotating the gears and screw.

The machine is supported in an operative position by the bar B, which may be driven into a crevice or hole in coal or rock or into earth. Thereupon the tube A can be adjusted upon bar B to move the machine to a suitable distance, and then by means of the universal joint the screw or the auger fastened thereon in usual manner can be turned in any desired direction, and then driven forward or withdrawn by turning the crank. The crank can be moved from one side to the other, if desired, for convenience in working, by slipping the bracket E from the sleeve I and moving it around, whereupon these parts can be again re-engaged and the machine operated as before.

Having thus described our invention, what we desire to secure by Letters Patent is—

1. In a coal-drilling machine, the supporting-bar provided with an adjustable extension, a frame pivoted in said extension and provided with laterally-extended arms transversely curved toward their outer slotted ends, the sleeve having an external rib and composed of two hinged parts, one of which is provided with bearings for the slots in said arms, a bracket provided with a socket having a slot to receive the sleeve-rib and adapted to receive and hold together the hinged parts of the sleeve, a screw-threaded tool-holder passing through the two-part sleeve and the bracket, and gear-wheels supported in the bracket, one of said gears having a spline-connection with the tool-holder, substantially as set forth.

2. In a coal-drilling machine provided with supporting devices, the screw, the two-part sleeve provided with an internal screw-thread and an external rib, and the gear-supporting bracket having an interior groove to engage the rib, substantially as set forth.

EDGAR WAGES.
SAMUEL H. ARMSTRONG.

Witnesses:
NATHAN C. MCGREW,
LEWIS THOMPSON.